(12) United States Patent
Letts et al.

(10) Patent No.: US 7,838,568 B2
(45) Date of Patent: Nov. 23, 2010

(54) INSULATION BOARDS AND METHODS FOR THEIR MANUFACTURE

(75) Inventors: John B. Letts, Carmel, IN (US); Wayne E. Laughlin, California, KY (US); Bruce M. Miller, Orange Park, FL (US)

(73) Assignee: BFS Diversified Products, LLC

( * ) Notice: Subject to any disclaimer, the term of this patent is extended or adjusted under 35 U.S.C. 154(b) by 0 days.

(21) Appl. No.: 10/632,343

(22) Filed: Aug. 1, 2003

(65) Prior Publication Data

US 2004/0102537 A1    May 27, 2004

Related U.S. Application Data

(60) Provisional application No. 60/400,779, filed on Aug. 2, 2002.

(51) Int. Cl.
*C08J 9/12* (2006.01)
(52) U.S. Cl. .............. 521/133; 521/130; 521/131; 521/170; 428/304.4; 428/423.1
(58) Field of Classification Search ........... 521/131, 521/133, 170, 130; 428/304.4, 423.1
See application file for complete search history.

(56) References Cited

U.S. PATENT DOCUMENTS

| | | | | |
|---|---|---|---|---|
| 3,286,992 A | * | 11/1966 | Armeniades et al. | 366/339 |
| 3,882,052 A | * | 5/1975 | Raynor et al. | 521/129 |
| 4,204,019 A | * | 5/1980 | Parker | 428/304.4 |
| 5,264,464 A | * | 11/1993 | Wishneski et al. | 521/126 |
| 5,472,990 A | * | 12/1995 | Craig et al. | 521/155 |
| 5,837,742 A | | 11/1998 | Fishback | 521/172 |
| RE36,674 E | | 4/2000 | Gluck et al. | 428/308.4 |
| 6,140,383 A | | 10/2000 | Soukup et al. | 521/155 |

FOREIGN PATENT DOCUMENTS

| WO | WO 00/24813 | 5/2000 |
|---|---|---|
| WO | WO 02/072680 | 9/2002 |

\* cited by examiner

*Primary Examiner*—John Cooney
(74) *Attorney, Agent, or Firm*—Sarah M. Jabbari; Arthur Reginelli

(57) ABSTRACT

A method of manufacturing a polyisocyanurate foam insulation board, the method comprising contacting a stream of reactants that comprise an isocyanate-reactive compound with a stream of reactants that include an isocyanate compound to form a reaction product, where the step of contacting takes place in the presence of a blowing agent and a low-boiling inert gas, and where the amount of low-boiling inert gas present at the time of the contacting is sufficient to result in frothing of the reaction product.

37 Claims, No Drawings

US 7,838,568 B2

INSULATION BOARDS AND METHODS FOR THEIR MANUFACTURE

This application gains benefit from U.S. Provisional Patent Application Ser. No. 60/400,779 filed on Aug. 2, 2002.

FIELD OF THE INVENTION

This invention relates to the manufacture of polyisocyanurate insulation boards.

BACKGROUND OF THE INVENTION

Polyurethane and polyisocyanurate foam insulation boards are commonly employed in the construction industry. These insulation boards are generally cellular in nature and typically include an insulating compound trapped within the cells of the foam. For example, it is common to produce insulation boards by employing hydrofluorocarbons, hydrochlorofluorocarbons and hydrocarbons as a blowing agent, which thereby entraps these compounds within the cell network for purposes of improving the insulating ability of the foam.

In addition to the insulating ability of the insulation boards, the physical characteristics of the board are likewise important to the overall performance of the board. For example, dimensional stability is important because insulation boards are exposed to a full range of weather. Where insulation boards are employed to insulate flat or low-slope roofs, shrinkage of these insulation boards from cold temperatures can cause a loss of insulating efficiency. As a result, it is common in the industry to test insulation boards for cold-age dimensional stability (ASTM D2126). Alternatively, the dimensional stability of insulation boards, primarily the 8 foot edges of a standard 8"×4" board, c an be determined by analyzing the perpendicular compressive strength in the cross machine direction. The higher the perpendicular compressive strength, the better the cold age dimensional stability.

The dimensional stability of insulation boards is believed to be impacted, especially near the edges of the board, by the degree of polyurethane crosslinking (isocyanurate formation). Incomplete crosslinking tends to be a problem near the edges of the board because less heat is present at the edges following manufacture of the boards. In other words, the boards are typically stacked or bundled following manufacture and the heat that is generated and trapped within the boards tends to drive crosslinking; the exposed surface area around the edges of the stacks or bundles allows the edges to cool more rapidly which results in decreased crosslinking.

Also, the use of certain blowing agents tends to promote dimensional instability. Namely, it is believed that certain hydrochlorofluorocarbons are rather soluble in the polymeric network of the board. As a result, the polymer network tends to plasticize the polymer network, which results in reduced network integrity.

Because insulation boards made of polyurethane or polyisocyanurate foams remain important articles for the construction industry, there is a need to improve the physical characteristics of the boards, such as cold age dimensional stability.

SUMMARY OF THE INVENTION

In general the present invention provides a method of manufacturing a polyisocyanurate foam insulation board, the method comprising contacting a stream of reactants that comprise an isocyanate-reactive compound with a stream of reactants that include an isocyanate compound to form a reaction product, where the step of contacting takes place in the presence of a blowing agent and a low-boiling inert gas, and where the amount of low-boiling inert gas present at the time of the contacting is sufficient to result in frothing of the reaction product.

The present invention also includes a method of manufacturing polyisocyanurate insulation boards, the method being of the type that includes contacting a stream of reactants that include an isocyanate-reactive compound with a stream of reactants that include an isocyanate compound to produce a reaction product, where the step of contacting takes place within a mix head in the presence of a blowing agent, the improvement comprising adding a low-boiling inert gas to at least one of the stream of reactants prior to the reaction product exiting the mix head, where the amount of low-boiling inert gas that is added is sufficient to cause the reaction product to froth within two seconds of leaving the mix head.

The present invention further provides a method for increasing the dimensional stability of polyisocyanurate foams, the method comprising providing an A-side stream of reactants that include an isocyanate, providing a B-side stream of reactants that include a isocyanate reactive component and a blowing agent, adding a low-boiling inert gas to the A-side or B-side stream of reactants, contacting the A-side and B-side reactants within a mix head to form a developing foam, and depositing the foam onto a laminator.

It has surprisingly been discovered that the amount of low-boiling inert gas within the ingredients used to make the insulation boards impacts the geometry of the cells, which directly impacts the perpendicular compressive strength of the insulation boards. As a result, an improved method for making insulation boards has been developed that advantageously employs one or more ingredients that contain a threshold amount of low-boiling inert gas. By employing at least one ingredient that includes a threshold amount of low-boiling inert gas, the developing cells within the insulation boards tend to be more spherical in geometry, which provides for insulation boards that have greater compressive strength over those boards that tend to have cells that are not spherical in geometry e.g., oval or oblong in the rise direction. As a result, the overall dimensional stability of the insulation boards of this invention, especially the dimensional stability along the edges of the boards, can be improved even though the cells may contain blowing agents that have a high degree of solubility within the insulation material or where the edges of the insulation board are less cured or crosslinked than the insulation material in the center of the boards. Another advantage is the ability to optionally apply a greater amount of developing foam at or near the sides of the laminator and thereby further improve the geometry of the cells; the viscosity and other conditions of the prior art developing foam inhibited or precluded a build-up of developing foam at or near the sides of the laminator.

DETAILED DESCRIPTION OF ILLUSTRATIVE EMBODIMENTS

The amount of low-boiling inert gas within the ingredients employed in making polyisocyanurate or polyurethane insulations boards is regulated so that a threshold amount of low-boiling inert gas is present when the ingredients leave the dispensing or mix head. Accordingly, the process of this invention preferably includes adding low-boiling inert gas to the insulation board ingredients or reactants in order to achieve a threshold amount of low-boiling inert gas within the ingredients. In a preferred embodiment, low-boiling inert gas is added to the B-side ingredients prior to mixing with the A-side ingredients. While many low-boiling inert gases can be employed, nitrogen is advantageously employed. Because air contains about 80% nitrogen, air is also advantageously employed. As a result, the terms air and low-boiling inert gas may be used interchangeably throughout the specification.

In general, and in a manner that is conventional in the art, the insulation boards of the present invention are produced by developing a polyurethane and/or polyisocyanurate foam in the presence of a blowing agent. The foam is preferably prepared by contacting an A-side stream of reagents with a B-side stream of reagents and depositing the mixture or developing foam onto a laminator. As is conventional in the art, the A-side stream includes an isocyanate and the B-side includes an isocyanate-reactive compound.

The A-side stream typically only contains the isocyanate, but, in addition to isocyanate components, the A-side stream may contain flame-retardants, surfactants, blowing agents and other non-isocyanate-reactive components.

Suitable isocyanates are generally known in the art. Useful isocyanates include aromatic polyisocyanates such as diphenyl methane, diisocyanate in the form of its 2,4'-, 2,2'-, and 4,4'-isomers and mixtures thereof, the mixtures of diphenyl methane diisocyanates (MDI) and oligomers thereof known in the art as "crude" or polymeric MDI having an isocyanate functionality of greater than 2, toluene diisocyanate in the form of its 2,4' and 2,6'-isomers and mixtures thereof, 1,5-naphthalene diisocyanate, and 1,4'diisocyanatobenzene. Preferred isocyanate components include polymeric Rubinate 1850 (Huntsmen Polyurethanes), Lupranate M70R (BASF), and polymeric Mondur 489N (Bayer).

The B-side stream, which contains isocyanate reactive compounds, may also include flame retardants, catalysts, emulsifiers/solubilizers, surfactants, blowing agents fillers, fungicides, anti-static substances, water and other ingredients that are conventional in the art.

The preferred isocyanate-reactive component is a polyol. The terms polyol or polyol component include diols, polyols, and glycols, which may contain water as generally known in the art. Primary and secondary amines are suitable, as are polyether polyols and polyester polyols. Useful polyester polyols include phthalic anhydride based PS-2352 (Stepen), phthalic anhydride based polyol PS-2412 (Stepen), teraphthalic based polyol 3522 (Kosa), and a blended polyol TR 564 (Oxid). Useful polyether polyols include those based on sucrose, glycerin, and toluene diamine. Examples of glycols include diethylene glycol, dipropylene glycol, and ethylene glycol. Of these, a particularly preferred glycol is diethylene glycol. Suitable primary and secondary amines include, without limitation, ethylene diamine, and diethanolamine.

Suitable blowing agents are also well known in the art. Classes of blowing agents include alkanes, (cyclo)alkanes, hydrofluorocarbons, hydrochlorofluorocarbons, fluorocarbons, fluorinated ethers, alkenes, alkynes and noble gases. Preferred classes are alkanes and hydrofluorocarbons. In a preferred embodiment, the blowing agents that are used are devoid of halogenated compounds, and it is especially preferred that the blowing agents are devoid of hydrofluorocarbons and hydrochlorofluorocarbons.

Suitable alkanes and (cyclo)alkanes include isopentane, n-pentane, cyclopentane, neopentane, n-butane, cyclobutane, methylcyclobutane, isobutane, propane, cyclopropane, methylcyclopropane, n-hexane, 3-methylpentane, 2-methylpentane, cyclohexane, methylcyclopentane, n-heptane, 2-methylheptane, 3-ethylpentane, 2,2,3-trimethylbutane, 2,2-dimethylpentane, cycloheptane, methylcyclohexane and 2,3-dimethylbutane.

Suitable hydrofluorocarbons include 1,1,1,2-tetrafluoroethane (HFC 134a), 1,1,1,4,4,4hexafluorobutane (HFC 356), pentafluoroethane (HFC 125), 1,1-difluoroethane (HFC 152a), trifluoromethane (HFC 23), difluoromethane (HFC 32), trifluoroethane (HFC 143) and fluoromethane.

Suitable hydrochlorofluorocarbons include chlorodifluoromethane (HCFC 22), 1-chloro-1,1-difluoroethane (HCFC 142b), 1,1,1-trifluoro-2,2-dichloroethane (HCFC 123) and dichlorofluoromethane (HCFC 21).

Suitable fluorocarbons include perfluoromethane (R14), perfluorocyclobutane, perfluorobutane, perfluoroethane and perfluoropropane.

Suitable fluorinated ethers include bis-(trifluoromethyl) ether, trifluoromethyl difluoromethyl ether, methyl fluoromethyl ether, methyl trifluoromethyl ether, bis(difluoromethyl)-ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether and 1,1,1,3,3,3-hexafluoroprop-2-yl fluoromethyl ether.

Suitable noble gases include krypton, argon and xenon.

Preferred blowing agents include those having zero ozone depletion potential. These blowing agents include alkanes and cycloalkanes such as n-pentane, isopentane, cyclopentane and mixtures thereof. Pentane isomers are particularly desirable blowing agents because they meet government mandates for the use of blowing agents having zero ozone depletion potential. Another alkane that meets government standards for its zero ozone depletion potential is isobutane, and small amounts of isobutane may be employed as a blowing agent according to this invention.

Catalysts are believed to initiate the polymerization reaction between the isocyanate and the polyol, as well as a trimerization reaction between free isocyanate groups when polyisocyanurate foam is desired. While some catalysts expedite both reactions, it is common to employ two or more catalysts to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyladiethylene triamine (PMDETA), 2,4,6-tris [(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, emulsifiers, and/or solubilizers may also be employed in the production of polyurethane and polyisocyanurate foams in order to increase the compatibility of the blowing agents with the isocyanate and polyol components.

Surfactants serve two purposes. First, they help to emulsify/solubilize all the components so that they react completely. Second, they promote cell nucleation and cell stabilization. Typically, the surfactants are silicone co-polymers or organic polymers bonded to a silicone polymer. Although surfactants can serve both functions, a more cost effective method to ensure emulsification/solubilization is to use enough emulsifiers/solubilizers to maintain emulsification/solubilization and a minimal amount of the surfactant to obtain good cell nucleation and cell stabilization. Examples of surfactants include Pelron surfactant 9868A, Goldschmidt surfactant B8469, and CK-Witco's L 6912. U.S. Pat. Nos. 5,686,499, and 5,837,742 are incorporated herein by reference to show various useful surfactants.

Suitable emulsifiers/solubilizers include DABCO Kitane 20AS (Air Products), and Tergitol NP-9 (nonylphenol+9 moles ethylene oxide).

Flame Retardants are commonly used in the production of polyurethane and polyisocyanurate foams, especially when the foams contain flammable blowing agents such as pentane isomers. Useful flame retardants include tri(monochloropropyl) phosphate, tri-2-chloroethyl phosphate, phosphonic acid, methyl ester, dimethyl ester, and diethyl ester. U.S. Pat. No. 5,182,309 is incorporated herein by reference to show useful blowing agents.

Low-boiling gases generally refer to those compounds or materials that are in the gaseous phase under ambient conditions. Ambient conditions may vary based on the location at which the insulation boards are manufactured, but those skilled in the art will be able to readily determine those compounds or materials that are in the gaseous phase under the geographical ambient conditions. The preferred gases are preferably inert with respect to the polyisocyanurate reagents.

The preferred low-boiling inert gases advantageously include those gases that boil at temperatures about 20° C., more preferably about 10° C., still more preferably about −1° C., and even more preferably below −18° C. Because nitrogen is inert with respect to the polyisocyanurate reagents and because nitrogen has an extremely low-boiling point, nitrogen is especially preferred. As those skilled in the art will appreciate, air comprises about 80% nitrogen, and therefore air is useful. As noted above, the term "air" may be used throughout this specification to refer to low-boiling inert gas, but it should be understood that the practice of this invention is not limited to the use of air. Preferably, the air or low-boiling inert gas is devoid of halogenated compounds, and it is especially preferred that the low-boiling inert gas is devoid of hydrofluorocarbons and/or hydrochlorofluorocarbons.

Practice of the present invention generally does not alter the amount of any ingredient employed or the relative ratios of any of the ingredients. In general, an excess of isocyanate to polyol is employed, especially where an isocyanurate foam is desired. For example, where a polymeric isocyanate is employed as the A-side reactant, about 150 to about 300 parts by weight of polymeric isocyanate per 100 parts by weight of polyol is employed (php).

With regard to the other ingredients, it is preferred to employ from about 0.5 to about 6 parts by weight surfactant php, from about 0.1 to about 2 parts by weight water php, from about 0 to about 25 parts by weight flame retardant php, and from about 10 to about 40 parts by weight blowing agent php. The amount of catalyst employed may vary greatly depending on the type or nature of the catalyst, but it is typically common to employ from about 1 to about 7 parts by weight metal salt php and about 0.1 to about 3 parts by weight amine php.

In a preferred embodiment, where the blowing agent is devoid of fluorinated and chlorinated hydrocarbons, it is preferable to employ a blend of hydrocarbons. In one particularly preferred embodiment, a blend containing about 60% to about 80% cyclopentane and about 20% to about 60% by weight isopentane is employed.

To best understand the amount of low-boiling inert gas that is preferably present to achieve the benefits of this invention, an understanding of the characteristics of the developing foam is important. As is generally understood by those skilled in the art, the contacting of the A-side and B-side reagents within the mix head produces a mixture that will begin to foam as a result of heat, which is generated by the chemical reaction taking place between the A-side and B-side reagents (usually the isocyanate and isocyanate-reactive components). This heat causes the blowing agents to boil and expend (i.e., the blowing agents are typically converted from the liquid to the gaseous state). Because this foaming is triggered by heat produced from a chemical reaction between the reagents, the foaming is not instantaneous, i.e., it does not occur within the first second or two that the mixture leaves the mix head. As a result, the viscosity of the mixture leaving the mix head is rather low.

The developing foam may also foam as a result of low-boiling point gases as they leave the mix head and expand. In other words, some blowing agents are gases at the temperature that the mixture leaves the mix head (e.g., about 18° C. to about 35° C.), but within the mix head and feed lines the reagents are compressed (e.g., about 2,000 psi) and therefore the low-boiling point gases are in their liquid state or emulsified (i.e., effectively absorbed) state. Once these low-boiling point blowing agents are released to atmospheric pressure (i.e., released from the mix head), these gases expand nearly instantaneously. In other words, these blowing agents quickly expand and thereby begin the foaming process prior to the time that the blowing agents that rely on the heat of reaction to expand can contribute to the foaming process. The impact that the low-boiling gases have on the developing foam (which is an instantaneous impact) may be referred to as frothing.

The presence of the threshold amount of low-boiling inert gases in the polyisocyanurate reagents according to this invention result in frothing, i.e., instantaneous foaming once the mixture leaves the mix head. This instantaneous frothing is believed to provide the benefits of this invention. Accordingly, the minimum or threshold amount of low-boiling inert gas that is preferably present in the polyisocyanurate ingredients is that amount that will cause instantaneous or near instantaneous frothing.

The minimum or threshold amount of low-boiling inert gas that is advantageously present in the polyisocyanurate reactants can be quantitatively determined or calculated in several respects. In one embodiment, the amount of low-boiling inert gas within the polyisocyanurate reactants can be determined based upon the change in volume of the mixture as it instantaneously leaves the mix head. This change in volume of the mixture as it instantaneously leaves the mix head is indicative of frothing. Accordingly, it is preferred that the amount of air that is present in the polyisocyanurate reactants is that amount that will increase the volume of the developing foam as it instantaneously leaves the mix head, i.e., within about two seconds, by at least 1.25, preferably by at least 1.5, more preferably by at least 1.75, still more preferably by at least 2.0, even more preferably by at least 2.5, and still more preferably by at least 3.0.

In another embodiment, the minimum or threshold amount of low-boiling inert gas that is present within the polyisocyanurate reactants can be quantitatively determined or calculated based upon the amount of air that is soluble in the ingredients under ambient conditions. In other words, and as those skilled in the art will appreciate, the polyisocyanurate reactants (e.g., the B-side ingredients) will contain air inasmuch as air is soluble within the ingredients. The amount of air that is soluble is a function of the equilibrium that is achieved between the amount of air within the ingredients and the atmosphere. The amount of air that is dissolved in any given ingredient or reactant under a set of conditions (e.g., standard conditions) is termed the Bunsen Coefficient. For example, most polyether polyols exhibit a Bunsen Coefficient in the range of about 6 to about 10 volume percent (about 1 atm and 24° C.). Accordingly, it is preferred that the amount of air that is present in the polyisocyanurate reactants is an amount that is at least 1.25 times greater than the Bunsen Coefficient, preferably greater than 1.5 times the Bunsen Coefficient, more preferably 1.7 times greater than the Bunsen Coefficient, still more preferably greater than 2 time the Bunsen Coefficient, more preferably greater than 2.5 the Bunsen Coefficient, and even more preferably at least 3 times the Bunsen Coefficient, with the foregoing Bunsen Coefficients being calculated at 75° C. and 1 atmosphere of pressure.

In one preferred embodiment, the threshold or minimum amount of low-boiling inert gas within the polyisocyanurate ingredients is simply determined based upon the amount of low-boiling inert gas within the B-side ingredients. Accordingly, one can practice this invention by simply regulating the amount of air or low-boiling inert gas within the B-side ingredients without reference to or concern for the amount of air or low-boiling inert gas within the A-side ingredients.

Besides regulating the amount of air within the A-side or B-side reactant stream, practice of this invention does not necessarily alter the procedures employed in preparing foam insulation boards.

For example, the process employed may include conventional low pressure mixing whereby the B-side reactants and blowing agent are mixed under atmospheric pressure and at temperatures of about 18° C. to about 29° C. The B-side mixture is then delivered to a mix head at a temperature of about 18° C. to about 85° F. and a pressure of about 25 psi to about 200 psi. The A-side stream is likewise delivered to the same mix head at a temperature of about 18° C. to about 100° F. and a pressure of about 25 psi to about 200 psi. The A-side and B-side reactants undergo mixing at this mix head and the resulting mixture becomes a developing foam that is deposited onto a laminator. The laminator may include a facer material onto which the developing foam is deposited. A second facer material may optionally be applied to the upper surface of the developing foam. The ultimate size of the resultant foam board is manipulated by adjusting the height of the moving form, i.e., restrained rise, by adjusting the sides of the moving form to a desired width, and by cutting the continuous foam product to a desired length.

In a preferred embodiment, the process includes high pressure mixing whereby the B-side reactants and blowing agents are mixed within a dynamic pin mixer at pressures in excess of about 80 psi at temperatures in excess of 10° C. This particular procedure is disclosed in a co-pending international patent that designates the United States (PCT/US02/06823), which is incorporated herein by reference. After mixing at the pin mixer, the B-side reactants are heated to a temperature of about 18° C. to about 29° C., and the pressure is increased to a pressure of about 1,800 to about 2,400 psi prior to delivery to the mix head where the temperature increases to about 29° C. to about 35° C.

The A-side is fed to the mix head at a temperature of about 85° to about 95° F. and a pressure of about 1,800 to about 2,400 psi. After mixing at the mix head, the developing foam is likewise deposited onto a laminator.

In one embodiment, a proportionately greater amount of developing foam is deposited at or near the sides of the laminator. This procedure advantageously further allows for the formation of a more spherical cells within the foam. The ability to deposit a proportionally greater amount of developing foam at or near the sides of the laminator is due to the fact that the developing foam resulting from practice of this invention is characterized by instantaneous frothing, as noted above. As a result, the developing foam has a greater viscosity upon leaving the mix head. This is advantageous over non-frothing or low viscosity foams, which tend to splash more and interrupt the smooth lay down of the foam, thereby causing inconsistencies in the foam, especially at the edges of the board. Non-frothing or low viscosity foams splash close to the side plates, which causes early build-up on the side plates. Practice of this invention thereby allows the operator to avoid moving the mix head away from the edge, which is done to avoid the problem and which further reduces the spherical nature of the cells near the edge of the board.

In view of the teachings herein, those skilled in the art will be able to readily determine the amount of low-boiling inert gas or air within the polyisocyanurate reactants. In view of this amount, air or low-boiling inert gas is preferably added to the reactants. In one preferred embodiment, low-boiling inert gas is added to the B-side stream. Where low pressure mixing of the blowing agent and polyol is employed, the air can likewise be blended into the polyol under low pressure together with the blowing agent. The low-boiling inert gas can likewise be added to the ingredients by the manufacturer of the ingredients, i.e., at a location that is different than the location where the polyisocyanurate foam is manufactured. Where high pressure mixing (e.g., pressures in excess of 500 psi) is employed to mix the blowing agent and polyol, the air can be blended into the polyol under high pressure or it can be added to the polyol under low pressure prior to mixing with the blowing agent. In yet another embodiment, the air can be added to the B-side stream at the mix head where the B-side stream is contacted with the A-side stream.

Various modifications and alterations that do not depart from the scope and spirit of this invention will become apparent to those skilled in the art. This invention is not to be duly limited to the illustrative embodiments set forth herein.

What is claimed is:

1. A method of manufacturing a polyisocyanurate foam insulation board, the method comprising:
   contacting a stream of reactants that comprise an isocyanate-reactive compound with a stream of reactants that include an isocyanate compound in a mix head at a pressure of about 1800 psi to 2400 psi to form a reaction product, where said step of contacting takes place in said mix head in the presence of a blowing agent and air, where the blowing agent is selected form the group consisting of alkanes, (cyclo)alkanes, hydrofluorocarbons, hydrochlorofluorocarbons, fluorocarbons, fluorinated ethers, alkenes, alkynes and noble gases; and
   adding an effective amount of the air in the stream of reactants comprising the isocyanate-reactive compound, or the stream of reactants including the isocyanate compound, or both, to increase the volume of developing foam as it instantaneously leaves the mix head prior to the time any blowing agent that relies on a heat of reaction to expand can contribute to any foaming process under atmospheric pressure by at least 1.25.

2. The method of claim 1, where the effective amount of air is dissolved in the stream including the isocyanate-reactive compound to increase the volume of developing foam as it instantaneously leaves the mix head, prior to the time any blowing agent that relies on a heat of reaction to expand can contribute to any foaming process, by at least 1.5.

3. The method of claim 1, where the effective amount of air is dissolved in the stream including the isocyanate-reactive compound to increase the volume of developing foam as it instantaneously leaves the mix head, prior to the time any blowing agent that relies on a heat of reaction to expand can contribute to any foaming process, by at least 1.75.

4. The method of claim 1, where the blowing agent is n-pentane, isopentane, cyclopentane, or mixtures thereof.

5. The method of claim 4, where the blowing agent is devoid of hydrofluorocarbons and hydrochlorofluorocarbons.

6. A method for making polyisocyanurate foams, the method comprising:

providing an A-side stream of reactants that include an isocyanate to a mix head at a pressure of about 1800 psi to 2400 psi;

providing a B-side stream of reactants that include a isocyanate reactive component and a blowing agent selected from the group consisting of alkanes, (cyclo) alkanes, hydrofluorocarbons, hydrochlorofluorocarbons, fluorocarbons, fluorinated ethers, alkenes, alkynes and noble gases to the mix head at a pressure of about 1800 psi to 2400 psi;

contacting the A-side and the B-side stream of reactants to form a developing foam; and adding an effective amount of nitrogen to the A-side or B-side stream of reactants to increase the volume of developing foam as it instantaneously leaves the mix head, prior to the time any blowing agent that relies on a heat of reaction to expand can contribute to any foaming process, under atmospheric pressure by at least 1.25.

7. The method of claim 6, where the effective amount of nitrogen is added to the B-side stream of reactants to increase the volume of the developing foam as it instantaneously leaves the mix head, prior to the time any blowing agent that relies on a heat of reaction to expand can contribute to any foaming process, by at least 1.5.

8. The method of claim 7, where the effective amount of nitrogen is added to the B-side stream of reactants to increase the volume of the developing foam as it instantaneously leaves the mix head, prior to the time any blowing agent that relies on a heat of reaction to expand can contribute to any foaming process, by at least 1.75.

9. The method of claim 6, where the blowing agent is n-pentane, isopentane cyclopentane, or mixtures thereof.

10. The method of claim 9, where the blowing agent is devoid of hydrofluorocarbons and hydrochlorofluorocarbons.

11. A method for making polyisocyanurate foams, the method comprising:

providing an A-side stream of reactants that include an isocyanate;

providing a B-side stream of reactants that include (i) an isocyanate reactive component selected from the group consisting of polyols and mixtures thereof, and (ii) a blowing agent selected from the group consisting of alkanes, (cyclo)alkanes, hydrofluorocarbons, hydrochlorofluorocarbons, fluorocarbons, fluorinated ethers, alkenes, alkynes and noble gases, where an excess of isocyanate to isocyanate reactive component is employed so as to produce a polyisocyanurate foam;

adding an effective amount of nitrogen to the A-side or B-side stream of reactants to increase the volume of developing foam as it instantaneously leaves the mix head under atmospheric pressure by at least 1.25, prior to the time any blowing agent that relies on a heat of reaction to expand can contribute to any foaming process; and contacting the A-side and B-side streams of reactants in a mix head at a temperature of about 29° C. to about 35° C. and a pressure of about 1800 psi to 2400 psi.

12. The method of claim 11, where the effective amount of nitrogen is added to the B-side stream of reactants to increase the volume of developing foam as it instantaneously leaves the mix head, prior to the time any blowing agent that relies on a heat of reaction to expand can contribute to any foaming process, by at least 1.5.

13. The method of claim 1, further comprising the step of depositing the developing foam on a laminator.

14. The method of claim 13, where the developing foam is continuously deposited on the laminator.

15. The method of claim 13, where the developing foam is deposited on the laminator such that a proportionally greater amount is deposited near the edges of the board.

16. The method of claim 1, where the A-side isocyanate is selected from the group consisting of diphenyl methane, diisocyanate, diphenyl methane diisocyanates and toluene diisocyanate, or mixtures thereof.

17. The method of claim 6, further comprising the step of depositing the developing foam on a laminator.

18. The method of claim 17, where the developing foam is continuously deposited on the laminator.

19. The method of claim 17, where the developing foam is deposited on the laminator such that a proportionally greater amount is deposited near the edges of the board.

20. The method of claim 6, where the A-side isocyanate is selected from the group consisting of diphenyl methane, diisocyanate, diphenyl methane diisocyanates and toluene diisocyanate, or mixtures thereof.

21. The method of claim 11, where the effective amount of nitrogen is added to the B-side stream of reactants to increase the volume of the developing foam as it instantaneously leaves the mix head, prior to the time any blowing agent that relies on a heat of reaction to expand can contribute to any foaming process, by at least 1.75.

22. The method of claim 11, where the blowing agent is n-pentane, isopentane, cyclopentane, or mixtures thereof.

23. The method of claim 22, where the blowing agent is devoid of hydrofluorocarbons and hydrochlorofluorocarbons.

24. The method of claim 11, where the developing foam is continuously deposited on the laminator.

25. A method of manufacturing a polyisocyanurate foam insulation board including continuously contacting a stream of reactants that comprise an isocyanate-reactive compound with a stream of reactants that include an isocyanate compound in a mix head to form a developing foam reaction product, and continuously depositing the developing foam on a facer in a laminator, the method comprising:

introducing an effective amount of an inert gas having a boiling point of less than 20° C. into the stream of reactants including the isocyanate-reactive compound or the stream of reactants including the isocyanate compound, or both, where the stream of reactants including the isocyanate-reactive compound and the stream of reactants including the isocyanate compound are continuously contacted in the presence of a blowing agent, where the blowing agent is selected form the group consisting of alkanes, (cyclo)alkanes, hydrofluorocarbons, hydrochlorofluorocarbons, fluorocarbons, fluorinated ethers, alkenes, alkynes and noble gases, to increase the volume of developing foam as it instantaneously and continuously leaves the mix head, prior to the time any blowing agent that relies on a heat of reaction to expand can contribute to any foaming process, under atmospheric pressure by at least 1.25 wherein the stream of reactants including the isocyanate-reactive compound is delivered to the mix head at a pressure of about 1800 psi to 2400 psi and wherein the stream of reactants including the isocyanate compound is delivered to the mix head at a pressure of about 1800 psi to 2400 psi.

26. The method of claim 25, where the inert gas has a boiling point of less than 10° C.

27. The method of claim 26, where the inert gas has a boiling point of about −1° C.

28. The method of claim 25, where the effective amount of inert gas is added to the stream of reactants including the isocyanate-reactive compound to increase the volume of the developing foam as it instantaneously and continuously leaves the mix head, prior to the time any blowing agent that relies on a heat of reaction to expand can contribute to any foaming process, by at least 1.5.

29. The method of claim 28, where the effective amount of inert gas is added to the stream of reactants including the isocyanate-reactive compound to increase the volume of the developing foam as it instantaneously and continuously leaves the mix head, prior to the time any blowing agent that relies on a heat of reaction to expand can contribute to any foaming process, by at least 1.75.

30. The method of claim 29, where the blowing agent is n-pentane, isopentane, cyclopentane, or mixtures thereof.

31. The method of claim 25, where the developing foam is deposited on the laminator such that a proportionally greater amount is deposited near the edges of the board.

32. A method for making polyisocyanurate foams, the method comprising:

providing an A-side stream of reactants including an isocyanate to a mix head;

providing a B-side stream of reactants that include a isocyanate-reactive component and a blowing agent selected from the group consisting of alkanes, (cyclo)alkanes, hydrofluorocarbons, hydrochlorofluorocarbons, fluorocarbons, fluorinated ethers, alkenes, alkynes and noble gases to the mix head; and adding an effective amount of an inert gas having a boiling point of less than 20° C. to the A-side or B-side stream of reactants, where said gas is inert to said A-side stream of reactants and said B-side stream of reactants, to increase the volume of developing foam as it instantaneously leaves the mix head, prior to the time any blowing agent that relies on a heat of reaction to expand can contribute to any foaming process, under atmospheric pressure by at least 1.25, where the A-side and B-side streams of reactants are contacted in the mix head at a temperature of about 29° C. to about 35° C. and a pressure of about 1800 psi to 2400 psi.

33. The method of claim 32, where the inert gas has a boiling point of less than 10° C.

34. The method of claim 33, where the inert gas has a boiling point of about −1° C.

35. The method of claim 34, where the inert gas has a boiling point of less than −18° C.

36. The method of claim 25, where the developing foam is frothy.

37. The method of claim 32 wherein the blowing agent is n-pentane, isopentane, cyclopentane or mixtures thereof.

* * * * *